United States Patent [19]

Yamagishi

[11] 4,029,128

[45] June 14, 1977

[54] DEVICE FOR PLUGGING A HOLLOW OF A CONCRETE PILE

[76] Inventor: Shigeharu Yamagishi, No. 296, Nakakawahara, Namerikawa, Toyama, Japan

[22] Filed: July 7, 1975

[21] Appl. No.: 593,190

Related U.S. Application Data

[63] Continuation of Ser. No. 495,311, Aug. 7, 1974, abandoned.

[30] Foreign Application Priority Data

Aug. 10, 1973 Japan .............................. 48-90187

[52] U.S. Cl. .................................................. 138/89
[51] Int. Cl.² ......................................... F16L 15/10
[58] Field of Search ........ 138/89, 93; 277/1, 237 R

[56] References Cited

UNITED STATES PATENTS

| | | | |
|---|---|---|---|
| 3,164,964 | 1/1965 | Josephson | 138/93 |
| 3,269,421 | 8/1966 | Telford et al. | 138/97 |
| 3,669,153 | 6/1972 | Weaver | 138/89 |
| 3,831,383 | 8/1974 | Crank | 138/89 |

*Primary Examiner*—Robert I. Smith

[57] ABSTRACT

A plug for a concrete pile having a hollow extending therethrough is in the form of inflatable bag made of impervious material and is secured in a portion of the follow adjacent the top end of the concrete pile in tight engagement with the inner surface thereof when the bag is in inflated position.

1 Claim, 3 Drawing Figures

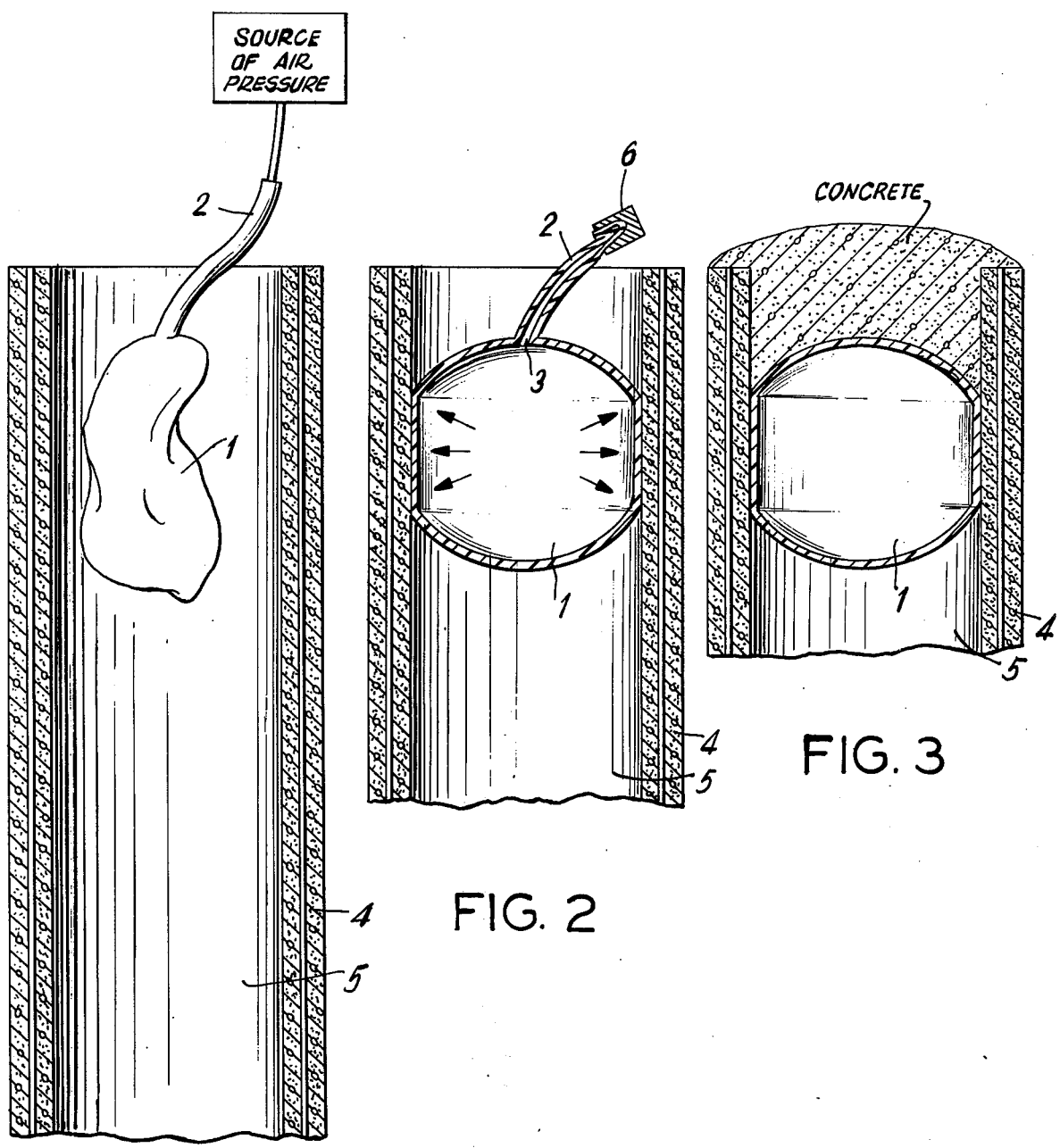

DEVICE FOR PLUGGING A HOLLOW OF A CONCRETE PILE

This is a continuation, of application Ser. No. 495,311 filed Aug. 7, 1974 and now abandoned.

The present invention relates to a device for plugging a hollow of a concrete pile driven into the ground as the foundation element in a building or construction work.

It has been known in the prior art that a disc-shaped plug is used to close the top of the hollow of the concrete pile driven into the ground to prevent a child or concrete material to be placed on the pile from falling into the hollow of the pile. In general, the disc-shaped plug is of a diameter substantially equal to the inside diameter of the hollow of the pile while the hollow of the pile has projections and/or irregularities on the inner surface thereof. Therefore, due to such irregular surface, it was much trouble to properly fit the disc-shaped plug into the hollow of the pile and it was difficult to safely hold the fitted plug in a predetermined position in the hollow for a period of time. If a frictional force between the plug and the inner surface of the hollow was insufficient, the plug would drop away from the predetermined position by subjecting it to the weight of concrete material which was placed on the top of the pile.

A main object of the present invention is to provide a device for plugging a hollow of a concrete pile in which the disadvantages as set forth above are eliminated.

Another object of the invention is to provide a device comprising an air bag as a plug for the hollow of the pile in which a frictional force between the bag and the inner surface of the hollow of the pile is increased sufficiently to support the weight of concrete material to be placed on the top of the pile.

According to the present invention, there is provided a plug in the form of air bag which is fixedly installed in the hollow of the concrete pile by disposing the collapsed bag in the portion of the hollow adjacent the top of the pile and introducing air under pressure into the bag to inflate it into contact with the inner surface of the hollow.

This invention now is described in detail by way of example with reference to the accompanying drawing wherein FIG. 1 is a schematic sectional view showing a concrete pile having a deflated bag therein which is connected to a source of air pressure represented by a box;

FIG. 2 is an elevational view in section showing the bag in an inflated condition; and FIG. 3 is a vertical section at right angles to FIG. 2 showing the inflated bag with concrete at the top of the pile.

In the drawing, a plug according to the present invention comprises an air bag 1 which is made of impervious flexible material such as rubber, soft synthetic resin or the like. The bag may be of any suitable shape such as sphere, ellipsoid or disc when in an inflated position. An air inlet pipe 2 of flexible material such as rubber is connected to an opening 3 formed in the bag 1. As will be clearly seen in the figure of the drawing, a concrete pile 4 which is driven into the ground, has a hollow 5 formed therethrough.

In operation, the bag 1 in a collapsed position as in FIG. 1 is inserted into a portion of the hollow 5 adjacent the top of the concrete pile 4 and the air inlet pipe 2 is connected to a supply of pressurized air (not shown). When air under pressure is introduced through the inlet pipe 2 into the interior of the collapsed bag 1, it inflates outwardly to come into contact with the inner surface of the hollow 5 of the pile. The further introduction of air into the bag 1 causes it to expand upwardly and downwardly along the inner surface of the hollow to increase a contact area of the bag with the inner surface of the hollow, as in FIG. 2.

The introduced air is confined in the interior of the bag by closing the opening of the air inlet pipe 2 by means of a clip 6 as shown in the drawing. (FIG. 2) thus, due to the frictional force between the increased outer surface of the bag and the inner surface of the hollow, the inflated bag is fixedly held in the hollow of the pile to effectively plug it. If the inflated bag is subjected to a weight of concrete material to be placed on the top of the bag as in FIG. 3, the confined air in the bag will be compressed to urge the wall of the bag against the inner surface of the hollow of the concrete bag so that the frictional force is further increased to prevent the bag from moving downwardly along the hollow of the pile.

It will be understood from the foregoing that the plug according to the present invention has several advantages in that it is simple in construction and can be easily installed in the hollow of the concrete pile even if the inner surface of the hollow has any irregularities.

I claim:

1. A method for plugging the center of a vertical hollow concrete pile driven into the ground comprising introducing into the hollow pile an air bag made of a flexible material impervious to air, inflating said bag from a source of air under pressure in an amount sufficient to force the bag into tight engagement with the interior side walls of said pile, disconnecting the bag from the source of air and closing the same while under pressure, and introducing concrete onto the top of the pile to subject the inflated bag to the weight of the concrete to compress the confined air therein and thereby urge the bag into tighter frictional engagement with said interior side walls during the plug formation.

* * * * *